United States Patent
Hashmi et al.

(10) Patent No.: US 11,954,436 B2
(45) Date of Patent: Apr. 9, 2024

(54) AUTOMATIC EXTRACTION OF SITUATIONS

(71) Applicant: Freshworks Inc., San Mateo, CA (US)

(72) Inventors: Syed Muneeb Syed Farukh Hashmi, Nanded (IN); Kathiravan Anbalagan, Chennai (IN); Kannan Raghavan, Winchester, MA (US)

(73) Assignee: Freshworks Inc., San Mateo, CA (US)

( * ) Notice: Subject to any disclaimer, the term of this patent is extended or adjusted under 35 U.S.C. 154(b) by 394 days.

(21) Appl. No.: 17/385,746

(22) Filed: Jul. 26, 2021

(65) Prior Publication Data

US 2023/0027050 A1 Jan. 26, 2023

(51) Int. Cl.
| | | |
|---|---|---|
| *G06F 40/35* | (2020.01) | |
| *G06F 40/211* | (2020.01) | |
| *G06F 40/284* | (2020.01) | |
| *G06F 40/30* | (2020.01) | |
| *G06N 5/02* | (2023.01) | |
| *G06N 20/00* | (2019.01) | |
| *G06F 40/237* | (2020.01) | |
| *G06F 40/279* | (2020.01) | |
| *G06F 40/295* | (2020.01) | |
| *G10L 15/18* | (2013.01) | |

(52) U.S. Cl.
CPC ......... *G06F 40/284* (2020.01); *G06F 40/211* (2020.01); *G06F 40/30* (2020.01); *G06F 40/35* (2020.01); *G06N 5/027* (2013.01); *G06N 20/00* (2019.01); *G06F 40/237* (2020.01); *G06F 40/279* (2020.01); *G06F 40/295* (2020.01); *G10L 15/1822* (2013.01)

(58) Field of Classification Search
None
See application file for complete search history.

(56) References Cited

U.S. PATENT DOCUMENTS

| | | | |
|---|---|---|---|
| 9,269,357 B2 | 2/2016 | Itoh et al. | |
| 10,073,840 B2* | 9/2018 | Hakkani-Tur | G06F 40/40 |
| 10,699,079 B1* | 6/2020 | Paley | G06F 40/30 |
| 10,878,184 B1* | 12/2020 | Estes | G06F 40/30 |
| 10,943,069 B1* | 3/2021 | Paley | G10L 17/18 |
| 10,943,072 B1* | 3/2021 | Jaganmohan | G06N 3/045 |
| 11,157,540 B2* | 10/2021 | Chandrasekaran | G06F 16/367 |
| 11,455,467 B2* | 9/2022 | Song | G06N 3/045 |
| 11,625,620 B2* | 4/2023 | Singaraju | G06N 5/025 |
| | | | 706/14 |
| 2005/0105712 A1* | 5/2005 | Williams | G10L 13/027 |
| | | | 704/275 |

(Continued)

OTHER PUBLICATIONS

Joty et al., "Topic Segmentation and Labeling in Asynchronous Conversations", Journal of Artificial Intelligence Research, 2013 (Year: 2013).*

*Primary Examiner* — Richard Z Zhu
(74) *Attorney, Agent, or Firm* — LeonardPatel PC

(57) ABSTRACT

Automatic extractions of situations includes creating a situation image includes accessing a conversation between a first user and a second user, and generating an abstract knowledge graph at one or more textual levels. The method also includes generating one or more manifests by pruning the abstract knowledge graph and segmenting the pruned abstract knowledge graph. The method further includes converting the one or more manifests into the situation image.

20 Claims, 11 Drawing Sheets

(56) References Cited

U.S. PATENT DOCUMENTS

| | | | |
|---|---|---|---|
| 2019/0155926 A1* | 5/2019 | Scheideler | G06F 16/215 |
| 2019/0236205 A1* | 8/2019 | Jia | G06F 16/3329 |
| 2020/0050605 A1* | 2/2020 | Tung | G06F 16/9024 |
| 2022/0114215 A1* | 4/2022 | Bekkerman | G06N 5/04 |
| 2022/0156582 A1* | 5/2022 | Sengupta | G06N 3/042 |
| 2022/0237222 A1* | 7/2022 | Liu | G06N 3/045 |
| 2022/0309357 A1* | 9/2022 | Zhang | G06F 40/211 |

* cited by examiner

Customer Complaint

Sent from < john27@gmail.com >

Hi,

I bought a Dell 2719P PC monitor from Dell store in New Jersey on the 5th of July last year. Yesterday, the monitor started blurring from the top right corner, now the top corner LED's are just bright red color. Please let me know how to proceed with this. The product is on warranty for another 1.5 years.

Agent Reply

Sent from < ramesh@dell.co.in >

Sent on Feb 22nd 2021

Hi John,

I am sorry to hear that your monitor is not working properly. Please reply with your contact details a copy of your invoice and warranty card.

Chat Conversation

Customer: Hi, I had booked a ticket from Bangalore to Pune with PNR no. CRN324543. I want to reschedule my flight ticket to 23rd Dec.
Agent: Hello Sir, We have two flights on that day at 2 pm and 4.45 pm. May I know what time would be better for you?
Customer: 2 pm works for me.
Agent: Sure, your flight has been rescheduled. This is your ticket for the same. Do you need any further assistance?
Customer: Yes, I want to book a flight between Pune to Delhi on the 2nd of Jan.
Agent: Sure. Please wait while I check the available flights.
Agent: There are 3 flights available on the 2nd of Jan respectively at 5 PM 10.30 pm and 11.25 pm.
Customer: can you please book the one at 5 pm?
Agent: Your flight ticket has been booked. You will receive a payment link on your registered mail. Please pay the same to confirm the booking.

- 
- 
-

AUTOMATIC EXTRACTION OF SITUATIONS

FIELD

The present invention relates to the field of natural language processing (NLP), and in particular, extracting situations from contents in email, tickets, conversations, and other text documents in an unsupervised fashion.

BACKGROUND

In the world of online customer service, customer situations cannot be predefined without human agent involvement. For example, although some situations and challenges can be defined by the human agent, not all situations can be defined by the human until encountered, since each customer experiences a different situation at different times. When these undefined situations are encountered, the human agents categorizes those situations. This, however, consumes substantial time and resources.

There are, however, some techniques that use a supervised situation extraction for speech systems. In those techniques, the occurrence of certain words and/or phrases in a speech conversation is used to extract the situation. However, this type of technique is limited by predefined situations that restrict variance in capturing human situations, thereby limiting the scalability of the system.

Accordingly, an automatic unsupervised situation extractor for a natural language where prior situation classes are not assumed is needed. Thus, a solution that extracts and identifies situations, issues, and/or scenarios from existing documents and/or discussions, all of which is performed without human agent involvement, is needed.

SUMMARY

Certain embodiments of the present invention may provide solutions to the problems and needs in the art that have not yet been fully identified, appreciated, or solved by current NLP technologies. For example, some embodiments pertain to extracting and identifying situations, issues, and/or scenarios from existing documents and discussions. Robotic control theory practiced in artificial intelligence (AI) is introduced in some embodiments to determine situations that are encountered by computers during interaction with a user.

In an embodiment, a method for creating a situation image includes accessing a conversation between a first user and a second user, and generating an knowledge graph at one or more textual levels. The method also includes generating one or more manifests by pruning the knowledge graph and segmenting the pruned knowledge graph. The method further includes converting the one or more manifests into the situation image.

In another embodiment, a computer program is embodied on a non-transitory computer readable medium. The computer program when executed by one or more processors is configured to access a conversation between a first user and a second user, and generating an abstract knowledge graph at one or more textual levels. The abstract knowledge graph is a graphical representation of a natural language text that establishes a cognitive interlinking between predicates, entities and other lexical information through various relationships. The computer program when executed by one or more processors is further configured to generate one or more manifests by pruning the abstract knowledge graph and segmenting the pruned abstract knowledge graph. The one or more manifests is a pruned knowledge graph of a particular situation. The computer program when executed by one or more processors is also configured to convert the one or more manifests into a situation image. The situation image is a scenario pertaining to an interaction between the first user and the second user.

In yet another embodiment, a system includes at least one processor and memory comprising a set of instructions. The set of instructions, with the at least one processor, are configured to access a conversation between a first user and a second user, and generate an abstract knowledge graph at one or more textual levels. The abstract knowledge graph is a graphical representation of a natural language text that establishes a cognitive interlinking between predicates, entities and other lexical information through various relationships. The set of instructions, with the at least one processor, are further configured to generate one or more manifests by pruning the abstract knowledge graph and segmenting the pruned abstract knowledge graph. The one or more manifests is a pruned knowledge graph of a particular situation. The set of instructions, with the at least one processor, are also configured to convert the one or more manifests into a situation image. The situation image is a scenario pertaining to an interaction between the first user and the second user.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not, therefore, to be considered to be limiting of its scope, the invention will be described and explained with additional specificity and detail through the use of the accompanying drawings, in which:

FIG. 4 is an example of a conversation that depicts a common occurring customer request for service.

FIG. 6 illustrates a natural language based conversation, representing two commonly occurring situations in a customer support namely, 'a rescheduling' and 'a new booking', according to an embodiment of the present invention.

DETAILED DESCRIPTION OF THE EMBODIMENTS

Some embodiments generally pertain to extracting situations using various knowledge engineering processes. A situation is a well-defined knowledge about a specific process and/or agenda. A situation may be a text-based scenario, which occurs through a conversation between entities. Entities may include a customer and a customer service agent. In other embodiments, entities may include one or more bots that a customer interacts with.

In a knowledge graph, a situational image may be defined by the entities involved, the space and time the entities interact in, the behavior and characteristics exhibited by those entities, the various attributes of the entities, and the set of variants that define the environment. The variants of the environment for an entity may include the entity's qualitative traits, measurable properties, field peculiarities.

In some instances, a text may not directly reveal the situation and may not exist in a single statement. So, in practicality, consider a conversation involving, guiding a customer through a troubleshooting process where the conversation starts out with the customer describing the product details and following it up with subsequent questions leading to a complex/multi-sentence situation.

To evaluate a situation from a text, a process, such as a manifest, is utilized in some embodiments. The manifest may reveal all knowledge around a particular situation. For example, a natural language text might contain many situations that are either dependent or unrelated. This may be true across most natural language documents. See, for example, FIG. 6, which is a snapshot 600 illustrating an example of customer interaction with a support agent, according to an embodiment of the present invention. In snapshot 600, two scenarios, namely, a rescheduling and a new booking are shown.

The manifest contains a detailed representation of a situation, e.g., the situation summarization, entities participating in the situation, behaviors, time and space, and variants, to name a few. The attributes and their co-reference links play an important part in extracting manifests from the knowledge graphs. The attributes of entities are the inherent properties qualitative or quantitative associated with a particular class. For example, consider a support request where a customer is complaining about the screen size of the laptop, or an inquiry about the quality of the speakers on the mobile phone. In the first case, one of the variants of the environment is the length of the screen, which is a quantifiable attribute associated with the entity laptop as opposed to the latter case, where the attribute to be extracted is qualitative.

Figure 1:
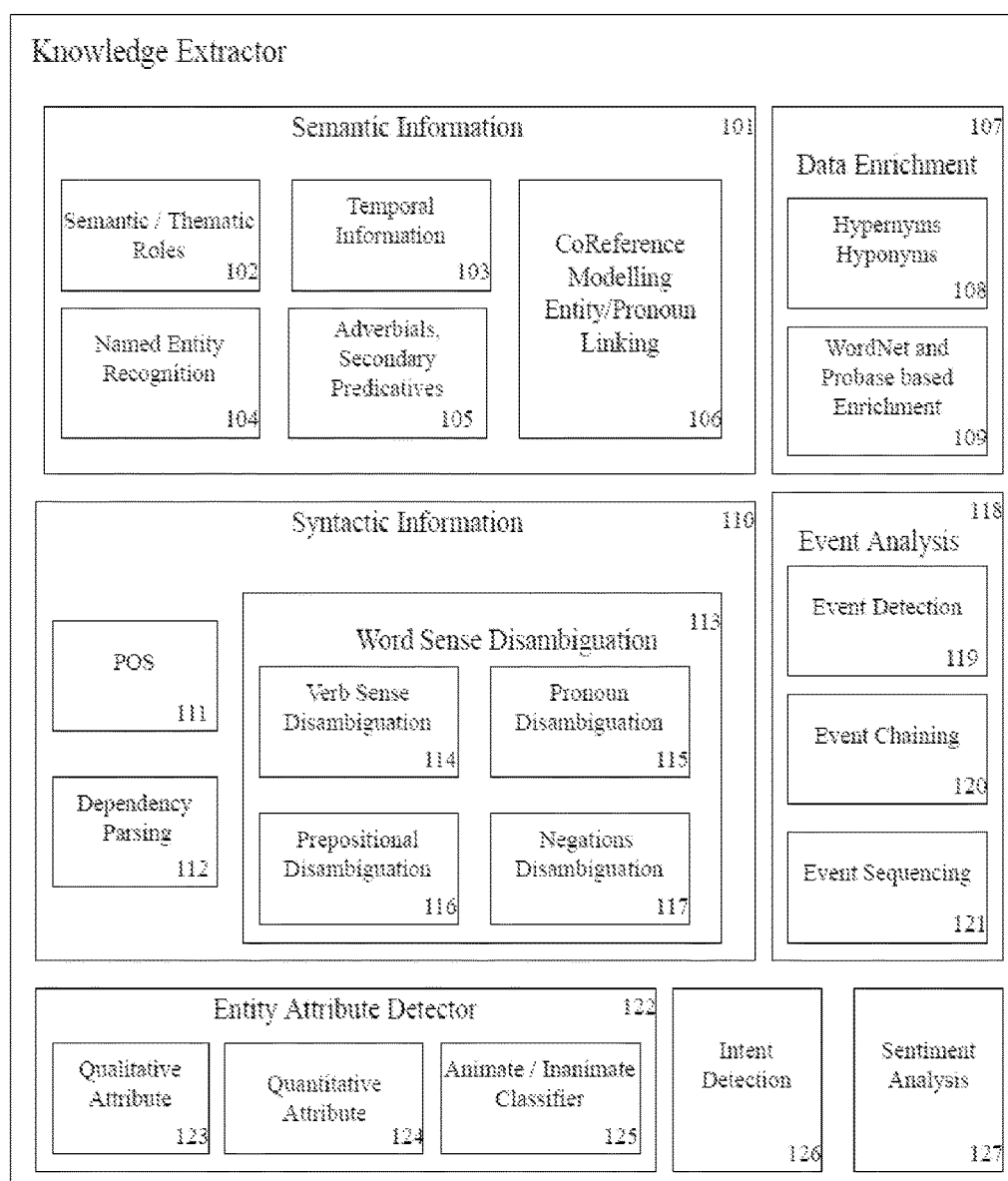
FIG. 1 is a block diagram illustrating a representation of knowledge extractor, according to an embodiment of the present invention.

FIG. 1 is a block diagram illustrating a representation of knowledge extractor 100, according to an embodiment of the present invention. Knowledge extractor 100 may contain a plurality of modules, each of which is described in more detail below.

In some embodiments, knowledge extractor 100 includes a semantic information module 101. Within semantic information module 101 exists a semantic/thematic roles (SR) module 102 for entities inside a text. In an embodiment, SR module 102 detects semantic arguments associated with the predicate from a sentence and their classification to specific roles. Additionally, SR module 102 detects modal arguments associated with the same predicate. This is the first level of labelling performed recursively to disambiguate the content and labelling with abstract knowledge definitions (e.g., actor, experiencer, patient, benefactor, etc.).

A temporal information module 103 extracts a number of temporal elements associated with a natural language text. Temporal information module 103 maintains track of the creation time and date of the document/conversation. Additionally, temporal information module 103 extracts temporal information, if any, from every sentence token in the natural language text. In various implementation, temporal information module 103 extracts temporal information using regular expressions patterns in combination with machine learning (ML) trained models to extract date and time tags from a natural language text to find and extract several types of temporal tags including, but not limited to, date expressions (e.g., on 8th July), time expressions (e.g., at 6'o clock), durations (e.g., 2 years), repetitive (e.g., every week).

Named entity Recognition (NER) module 104 detects named entities (e.g., person, location, organization, numerical, etc.) present in the natural language text. NER module 104 may be implemented with a Neural Network model. In some embodiment, NER module 104 may detect custom entity tags specific to business cases. Adverbial and secondary predicates module 105 is a structured extraction of rule-based semantic information. This extraction of information helps in detecting custom intents associated with a conversation.

Co-reference modelling entity/pronoun linking module 106, in some embodiment, extracts and links common entity references present in and across documents. In some embodiment, co-reference modelling entity/pronoun linking module 106 may be implemented using a Neural Network module trained on tagged data with co-references of various global and/or custom entities. Further, this module 106 may utilize a structured database of entities referenced with variations of references in natural language. Take, for example, 'New York', which can be referenced as 'NYC'. A named entity and its reference pronouns are also linked through this modelling, e.g., a person referred by his/her pronoun may be linked using this module. In some embodiment, module 106 may also capture and link variants of references for the same entity present across natural language documents.

Data enrichment module 107, in some embodiments, include a variety of related knowledge of equivalence for entities that are present inside a natural language text. This is usually derived from the public domain and from well-defined research repositories such as WordNet Probase. This module 107 also creates a hierarchy of entity-tags with hyponyms, hypernyms, etc.

In some embodiments, a syntactic information block 110 extracts various syntactic tags and relational information. For the purposes of explanation, syntactic information block 110 utilizes a number of Neural network based models trained on public and/or proprietary data to extract syntactic information. POS module 111 (Parts of Speech) module assigns parts of speech tags to the natural language text. Dependency parsing module 112 creates a parsed tree of information associated with the text. In some embodiments, modules 111 and 112 utilize models trained on public repositories like Penn-tree bank.

It should be appreciated that words can have multiple meanings depending on the context of the sentence. Word sense disambiguation provides the cognitive ability to disambiguate the correct meaning of the word across different contexts. Word sense disambiguation module 113 may solve disambiguation problems associated with a number of lexicons including, but not limited to, verbs, pronouns, prepositions, and adverbials. Verb sense disambiguation module 114 may create the abstract layer for verbs that would otherwise relate the entities to the verb. This breaks the polysemic nature of verbs during knowledge extraction. Pronoun disambiguation module 115 may replace pronouns with real nouns such that the knowledge related to the nouns are related and/or connected across sentences, phrases, and documents. Prepositional disambiguation module 116 may define the nature of preposition (e.g., 12 classes of prepositions) given entity and verbal semantic roles. Negations and reciprocals module 117 may differentiate negativity and reversal meaning.

Every document may have its own set of the timeline. Further, each document may have an occurrence of events that are standardized. In some embodiments, an event analysis module 118 performs event detection 119, event chaining 120, and event sequencing 121 with modality and accent. Event analysis module 118 further classifies the events into various nature, such as real or perceptional, and aspects such as frequent, never, once, and rare. Event detection module 119 detects and tags each event in a document. Event chaining module 120 extracts and separates multiple event chains if any. Event sequencing module 121 orders these events chains and stores a sequence of events in order of their temporal occurrence.

Entity attribute detector module 122 utilizes entity tags from semantic and syntactic information 110, and for all the list of entities present in these modules, entity attribute detector module 122 extracts certain properties and/or attributes associated with the entity. Qualitative attribute module 123 assigns various abstract qualitative measures related to the state of the entity. Similarly, quantitative attribute module 124 assigns quantitative measures associated with the entity. Both the qualitative and quantitative measures of entities are predefined custom classes, and can be defined beforehand for an entity or set of entities. Animate/inanimate classifier 125 assigns a binary class to the entity based on several attributes. Animate/inanimate classifier 125 may use a combination of semantic and data enrichment and Named Entity tags to classify an entity into animate or inanimate. It should be appreciated that animate and inanimate help in creating attributes for entities. For example, an animate entity (most likely) a human may have attributes like sentiment. An inanimate entity may have some domain-specific attributes like a warranty to name one.

In some embodiments, the entity is detected or identified as being animate or inanimate. In one example, an animate entity can be referred to as a person while an inanimate entity can be referred to an object such as a laptop. In these embodiments, using a data enrichment model, a name entity recognition model, and a syntactic information, the entity is identified as being animate or inanimate. See block 125 under entity attribute detector 122. The data enrichment model identifies hypernyms to trace a root of the entity with the root identifying the animate or inanimate entity. The named entity recognition model identifies a person tag, which is assigned to the animate entity. The syntactic information includes pronouns and/or one or more proper nouns, which are linked through coreference links. Using the syntactic information and the coreference links, the entity is assigned as animate entity and inanimate entity.

Intent detection module 126 extracts custom intents from a natural language text. Examples of custom intent may include order, booking, cancellation, reschedule, help, and query. The intent class of a sentence token or a group of sentence tokens is further used to separate manifest images in a complex document.

Sentiment analysis module 127 extracts generic sentiment of the text. Further, few custom sentiment tags such as sad, angry and disappointed, are extracted and associated to the animate entities such as an agent or customer that are detected in previous modules.

Figure 2:
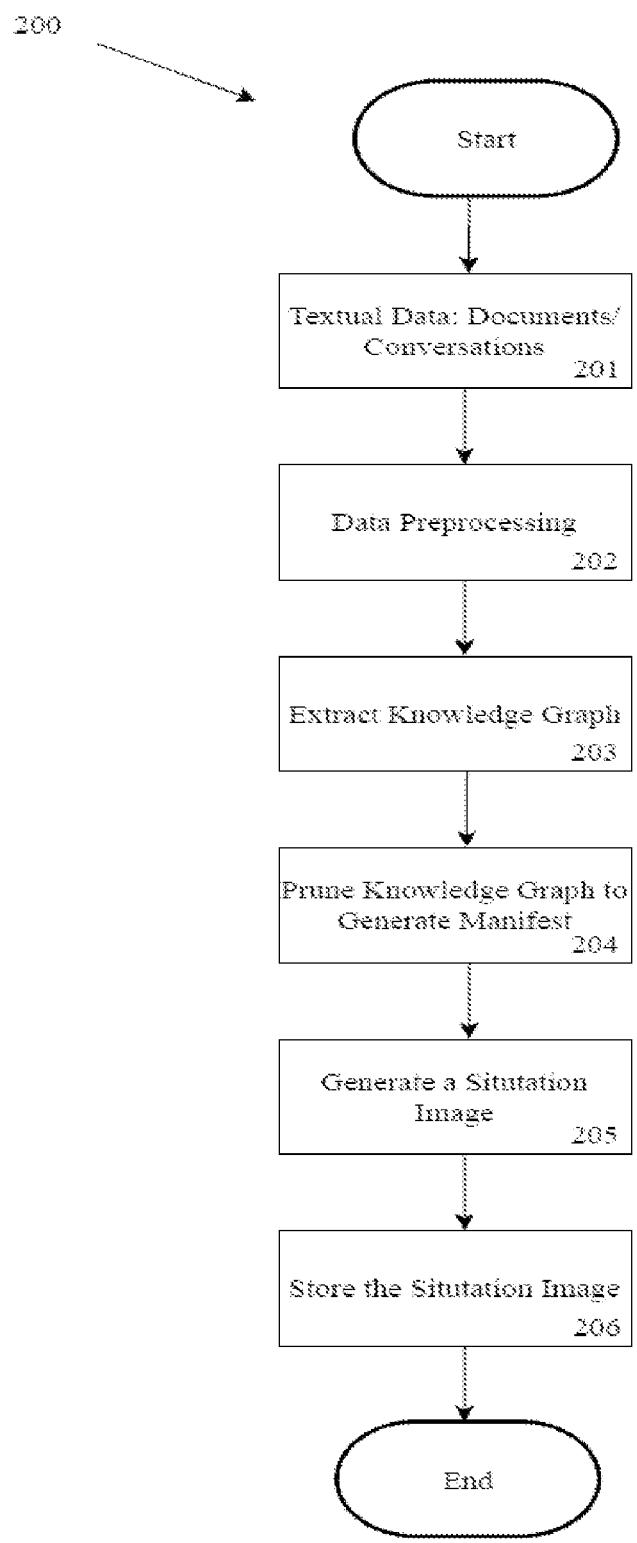
FIG. 2 is a flow diagram illustrating a method for extracting situations, according to an embodiment of the present invention.

FIG. 2 is a flow diagram 200 illustrating a method for extracting situations, according to an embodiment of the present invention. In some embodiments, the method 200 begins with the computing system accessing documents and/or conversations at 201. The documents and/or conversations are text content, which is fed into a computer program in a readable format. This textual (data) content is preprocessed at 202. The preprocessing includes spelling and grammatical corrections, masking or redaction of sensitive data, and removal of redundant texts such as email signatures. At 203, the computing system uses a knowledge graph generator module to generate an abstract knowledge graph at each textual level. For example, there may be a textual level for terms, phrases, clauses, sentences, paragraphs, documents, and/or across documents). This knowledge is pruned and segmented into multiple manifests at 204. Each manifest defines a situation, and the graphical representation of each manifest is then converted into a situation image at 205. In some embodiments, the situation image is considered as a single sub-graph of a situation that occurs across multiple graphs from the knowledge graph module.

At 206, the computing system stores one or more situation images in a situation graph storage. The situation graph storage is a storage media (in all forms that can read and write from the storage), and contains the data of the situations in various representations and structural formats.

Depending on the embodiment, the method may include summarizing a situation based text upon pruning of the knowledge graph and generating of the one or more manifests. For example, the method may include identifying a predicate (e.g., verb) connected to one or more sentences belonging to a corresponding one of the one or more manifests, and summarizing the situation based text after segmenting the one or more manifests from the pruned knowledge graph. In some embodiments, the situation based text is a summarization of a scenario of the one or more sentences.

Figure 3:
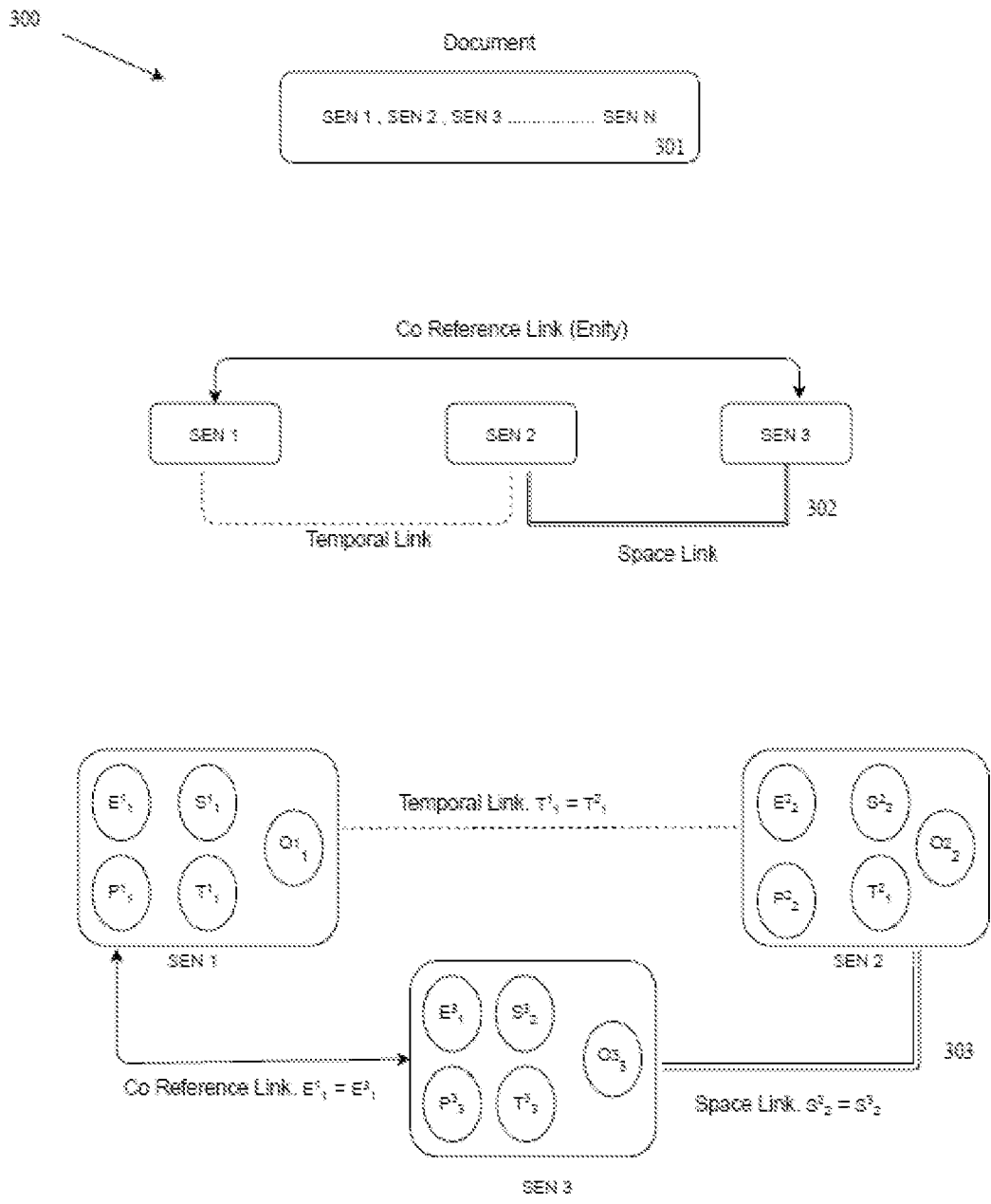
FIG. 3 depicts an example of a manifest, according to an embodiment of the present invention.

It should be appreciated that a natural language text may contain many situations that are either dependent or unrelated. A manifest may reveal all the knowledge around a particular situation happening in a natural language text. FIG. 3 depicts an example of a manifest 300, according to an embodiment of the present invention. In some embodiment, manifest 300 is defined as structured information extracted from natural language text. A manifest, in some embodiment, is a co-location of multiple variables pertaining to a situation including, but not limited to, entities participating in a situation, behaviors and/or characteristics exhibited by those entities, several spatial and temporal aspects of the environment and the relationships among aforementioned variables. A more particular description of the terminologies used in the FIG. 3 are briefly described below.

1. Entities ($E_j^i$)
    a. An Entity may be defined as a specific person, place, or thing thus extending our definition from a concrete noun phrase. An entity may describe any animate or inanimate object involved in a scenario described in any computer-readable text.
    b. Behaviors/Characteristics of Entity are certain peculiarities pertaining to an Entity. For example, an animate entity may have behaviors such as the emotional state of that entity, an action performed, and the perceptive and/or cognitive state of the entity.
    c. Quantitative and qualitative information are measures associated with particular entities that describe the qualitative and quantitative behavior of the entity. For example, let's consider a laptop, which has few measurable quantitative characteristics such as screen size and number of pixels on the screen. Using this example, the state of the laptop in a complaint about laptop battery performance may indicate a qualitative aspect of the entity.
2. Temporal Elements ($T_j^i$) may pertain to individual events occurring in a situation, including their relative ordering. The elements in a situation are mainly the date and time associated with those individual events. Individual timestamps of these events may also be used to sequence the events for further inference.
3. Space Elements ($S_j^i$) may pertain to the global demographic, location/place where the interaction under analysis is taking place. These elements include the geographic location, location of specific non-animated entities, such as an office or a hospital, and may also include relative locations of multiple entities described by certain prepositions.

Figure 5:
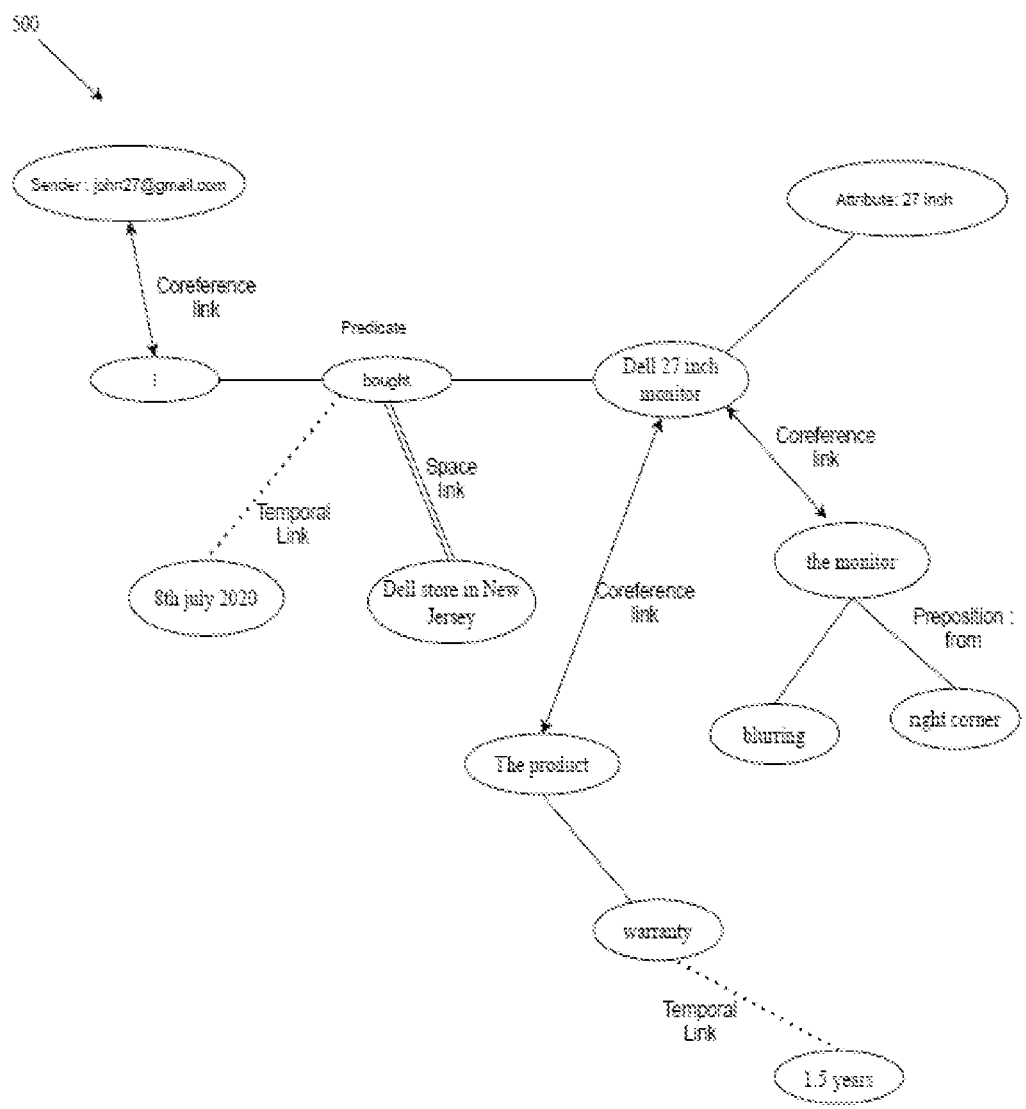
FIG. 5, in some embodiment, illustrates a manifest extracted from conversation of FIG. 4, according to an embodiment of the present invention.

FIG. 4 is an example of a conversation 400 that depicts a common occurring customer request for service. FIG. 5, in some embodiment, illustrates a manifest 500 extracted from conversation 400 of FIG. 4, according to an embodiment of the present invention. Manifest 500 shows the entities described in the conversation including their co-reference links and attributes associated with the entities, the temporal information, and other similar information surrounding the conversation.

FIG. 6 illustrates a natural language based conversation 600, representing two commonly occurring situations in a customer support namely, 'a rescheduling' and 'a new booking', according to an embodiment of the present invention. In this illustration, conversation 600 is between the customer and agent.

Figure 7:
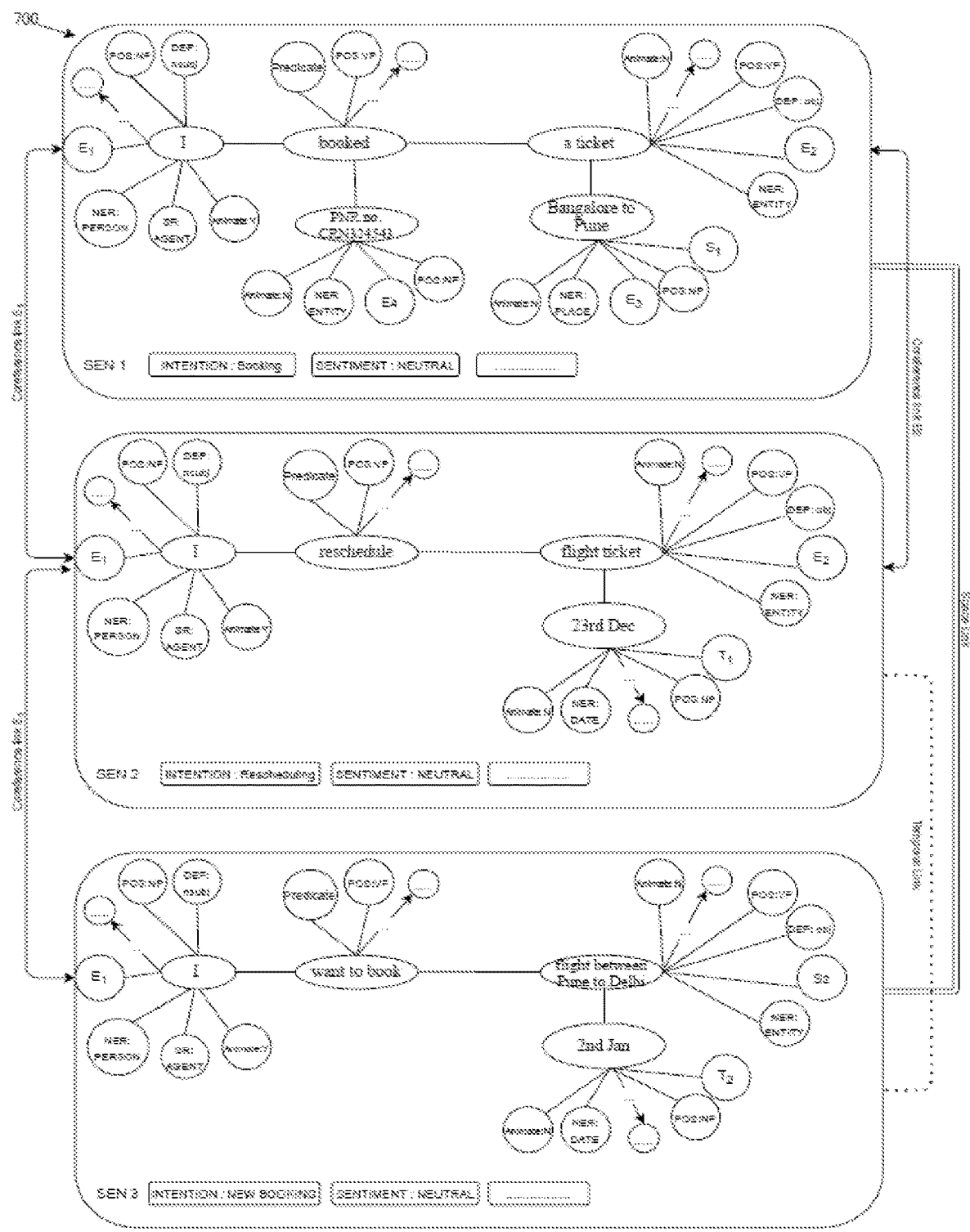
FIG. 7 is a graph illustrating an abstract representation of knowledge extracted from conversation depicted in FIG. 6, according to an embodiment of the present invention.

FIG. 7 is a graph 700 illustrating an abstract representation of knowledge extracted from conversation 600 depicted in FIG. 6, according to an embodiment of the present invention. This graph 700 depicts a detailed representation of knowledge extracted according to block diagram 100 of FIG. 1 from the natural language conversation. The extracted knowledge depicted in graph 700 shows various attributes and linking including, but not limited to, entities present and their various attributes/properties, date-time information, intention, sentiment and the links across entities linking through co-reference, space and time.

Figure 8:
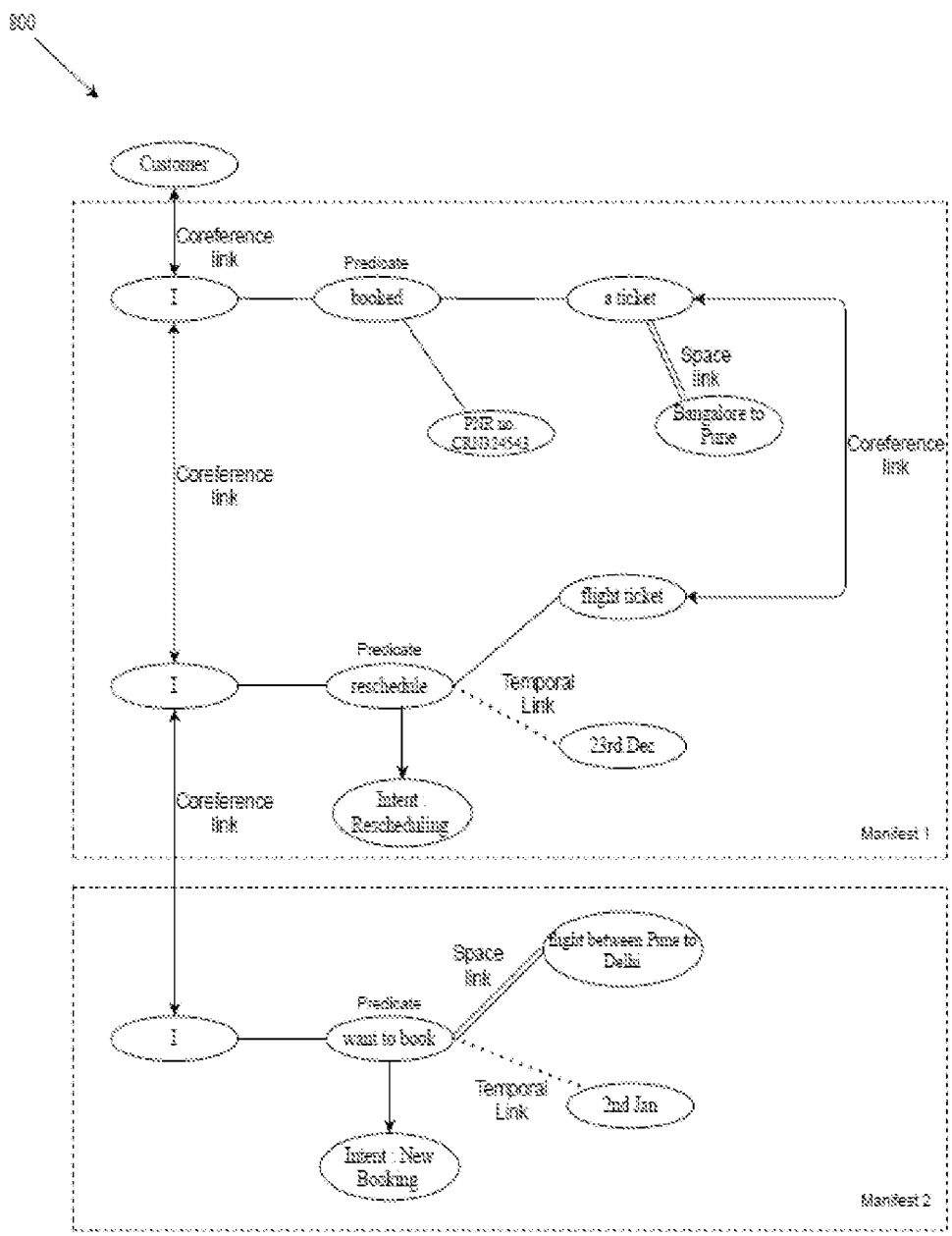
FIG. 8 illustrates an extracted manifest image from a multi-situation scenario happening in natural language text depicted in FIG. 6, according to an embodiment of the present invention.

FIG. 8 illustrates an extracted manifest image 800 from a multi-situation scenario happening in natural language text depicted in FIG. 6, according to an embodiment of the present invention. To generate a manifest image 800 from extracted knowledge graph 700, a process of pruning is utilized. In some embodiment, a computing system may prune and/or remove redundant knowledge, which might be present in knowledge extracted. Further, this pruned knowledge graph may be segmented into multiple manifest images. In some embodiment, a computing system may employ a graph segmentation based on the strength of the various links including, but not limited to, co-reference links, spatial links, temporal links, and event chains across different sentences in a natural language text. This computing system may also utilize other information such as intent, sentiment, and various attributes of the entities extracted.

Figure 9:
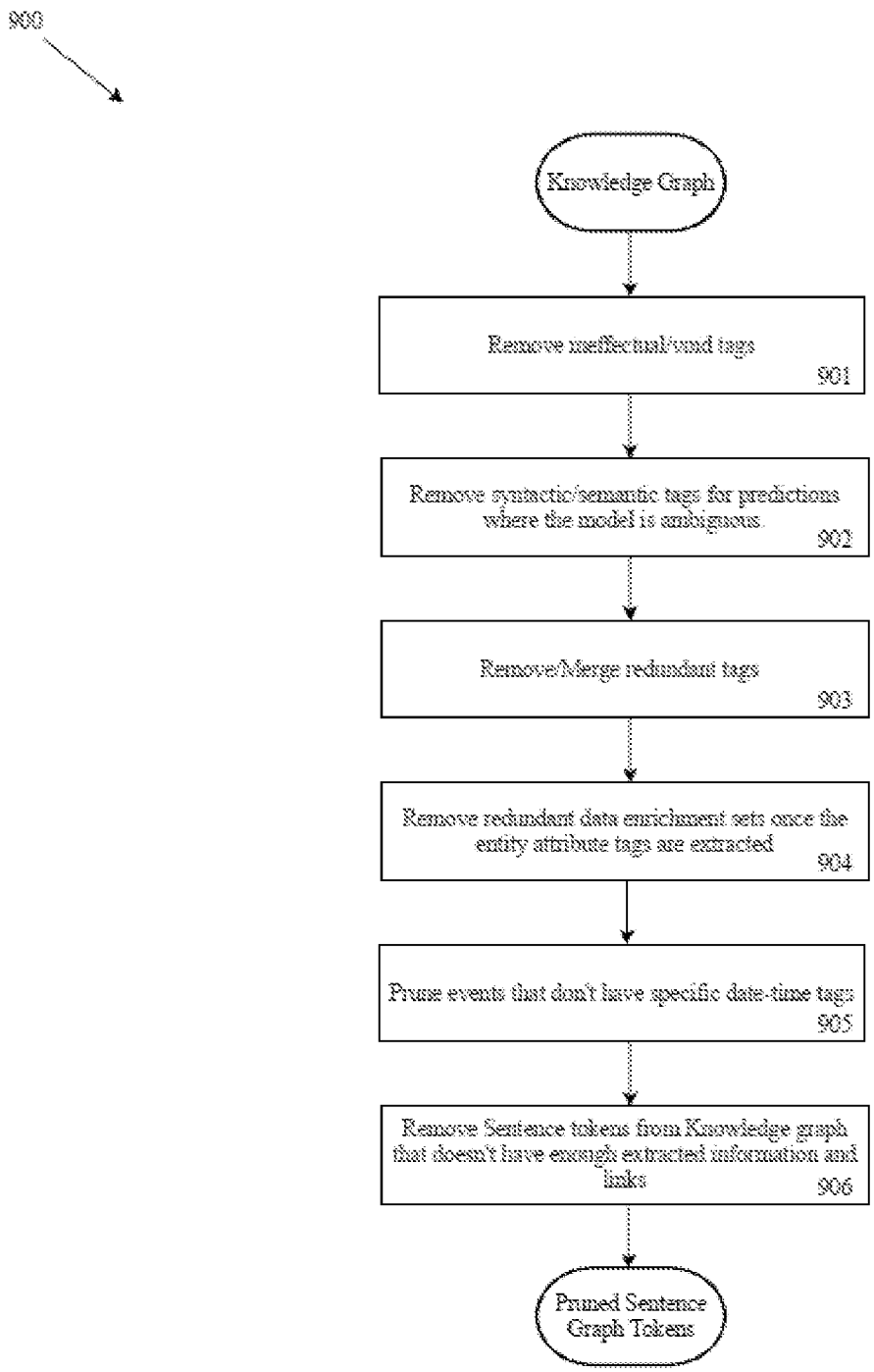
FIG. 9 is a flow diagram illustrating a method for pruning a knowledge graph, according to an embodiment of the present invention.

FIG. 9 is a flow diagram 900 illustrating a method for pruning a knowledge graph, according to an embodiment of the present invention. In some embodiment, a computing system is configured to prune the knowledge graph. At 901, the ineffectual/trivial tags, such as empty temporal tags, neutral sentiments etc., are removed from the graph. At 902, extracted tags are evaluated against the confidence of the ML models and the ambiguous tags are discarded. Confidence in some embodiments may be defined as probability of the tag belonging to a predicted class by the underlying ML model. At 903, the redundant tags (e.g., repeated entity attributes that are already linked through co-reference links) and repeated sentence level tags (e.g., intent) are discarded. The data enrichment, such as hypernyms/hyponyms, are used to retrieve some attributes of the entities, at 904. Attributes may be defined certain properties or particularities that are unique to one or more entities. In other words, collection of attributes define an entity. Attributes may include shape, size and color for an entity that has a physical object as hypernym. Once the entity has been associated with a particular class/hypernym, the entity attributes pertaining to that class are assigned to that entity and respective attributes are extracted from the text. Data enrichment tags help in associating and establishing such relationships to predict attributes. Once the association is complete, these tags are discarded from the knowledge graph, in an embodiment. At 905, events information extracted from module 118 of FIG. 1 is validated against the multiple event chains, if any. Events information may include absolute or relative time stamps between two events happening in a situation. In some embodiments, there may be a sequence of multiple events happening chronologically in a text based scenario, which we refer to as event chains. Event tags for events where their temporal information is unavailable nor are the event tags sequenced with other events are discarded. After steps 901-905 are completed, sentence tokens are discarded at 906 if they do not have enough tags and links present. This pruned graph may then be stored for further segmentation for getting manifest images. FIG. 8 shows one example of a pruned graph.

Figure 10:
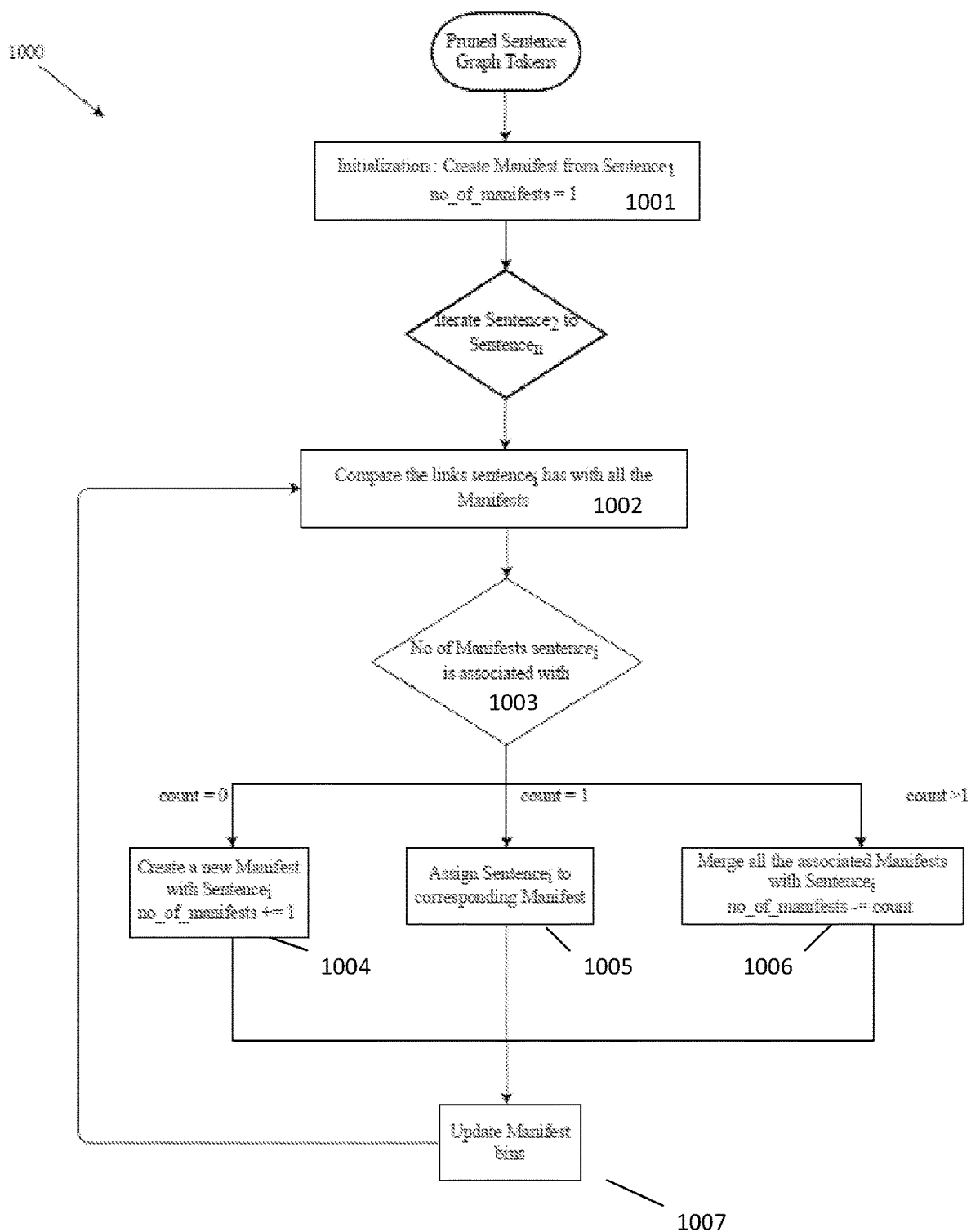
FIG. 10 is a flowchart illustrating a method for segmenting a pruned knowledge graph into multiple manifests, according to an embodiment of the present invention.

FIG. 10 is a flowchart illustrating a method 1000 for segmenting a pruned knowledge graph into multiple manifests, according to an embodiment of the present invention. Essentially, the segmenting of the pruned knowledge graph occurs at the sentence token level. At 1001, the algorithm initializes manifest 1 with sentence 1. At 1001, sentence 2 is evaluated based on links sentence 2 has with manifest 1 (i.e., sentence 1) at 1002, and based on evaluation, if sentence 2 is not associated with sentence 1, one or more of the following may apply at 1003. For example, sentence 2 is either added into manifest 1 or a new manifest 2 is created with sentence 2. For example, sentence 2 is reviewed to see if there is an association with sentence 1. If there is an association, manifest 1 now includes sentences 1 and 2. See step 1003. If, however, sentence 2 has its own links and words (i.e., there is no association), then a second manifest (or manifest 2) is created. See step 1004.

Alternatively, for sentence$_i$, sentence$_j$ may be assigned to a new manifest (see step 1004), assigned a corresponding manifest (see step 1005), or merged with all associated manifests (see step 1006). Stated another way, on the way of repeating, the i-th sentence is compared with all the m manifests and based on how many associations it has, manifest bins are updated as below.

i. No association with any of the m manifests: create manifest m+1 with sentence i in it.
 ii. Association with one manifest: add sentence i into the associated manifest bin.
 iii. More than one association: merge all the associated manifest into one bin and add i-th sentence into this merged manifest bin Each bin after segmenting allows for situation image to be created. See step 1007.

Figure 11:
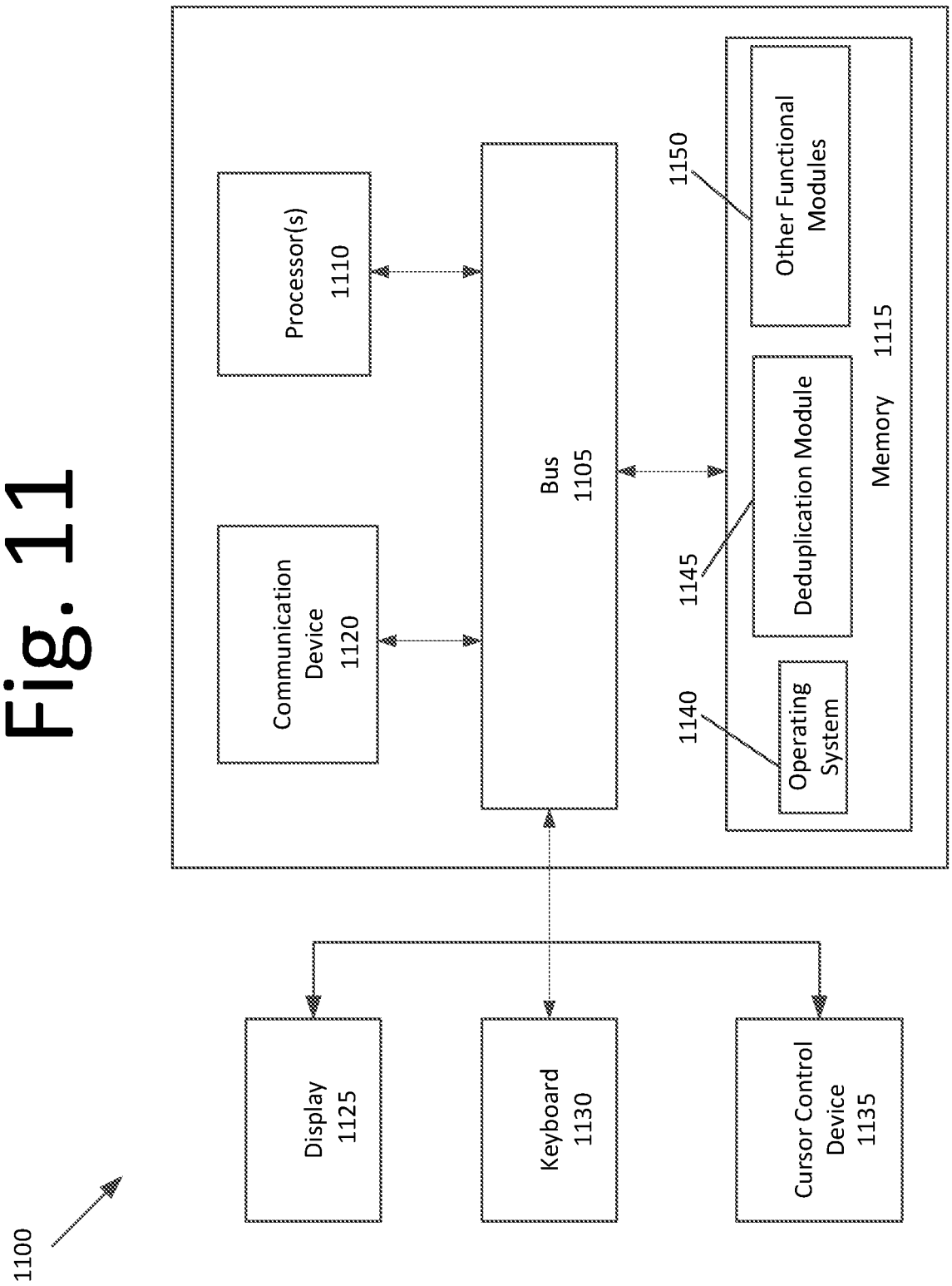
FIG. 11 is an architectural diagram illustrating a computing system configured to extract situations using various knowledge engineering processes, according to an embodiment of the present invention.

FIG. 11 is an architectural diagram illustrating a computing system 1100 configured to extract situations using various knowledge engineering processes, according to an embodiment of the present invention. In some embodiments, computing system 1100 may be one or more of the computing systems depicted and/or described herein. Computing system 1100 includes a bus 1105 or other communication mechanism for communicating information, and processor (s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes a memory 1115 for storing information and instructions to be executed by processor(s) 1110. Memory 1115 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both.

Additionally, computing system 1100 includes a communication device 1120, such as a transceiver, to provide access to a communications network via a wireless and/or wired connection. In some embodiments, communication device 1120 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1120 may include one or more antennas that are singular, arrayed, phased, switched, beamforming, beamsteering, a combination thereof, and or any other antenna configuration without deviating from the scope of the invention.

Processor(s) 1110 are further coupled via bus 1105 to a display 1125, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1125 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1130 and a cursor control device 1135, such as a computer mouse, a touchpad, etc., are further coupled to bus 1105 to enable a user to interface with a computing system. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include an abstract knowledge extractor module 1145 that is configured to perform all or part of the processes described herein or derivatives thereof. Computing system 1100 may include one or more additional functional modules 1150 that include additional functionality. For example, abstract knowledge extractor module 100 may include a plurality of sub-modules. See FIG. 1.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 9 and 10 may be performed by a computer program, encoding instructions for the processor(s) to perform at least part of the process(es) described in FIGS. 9 and 10, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 1110 of computing system 1100 of FIG. 11) to implement all or part of the process steps described in FIGS. 9 and 10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   accessing a textual conversation associated with a document stored in memory between a user and at least one of a bot and another user;
   generating an abstract knowledge graph, wherein the abstract knowledge graph is a graphical representation of a plurality of entities and links to one or more attributes defining the entities, which are extracted from a natural language text associated with the textual conversation, and wherein the abstract knowledge graph comprises multiple entities representing a plurality of identified situations associated with one or more identified intentions;
   generating one or more manifests by pruning the abstract knowledge graph to remove redundant information;

segmenting the pruned abstract knowledge graph into a plurality of manifests each sharing a common entity among the plurality of entities; and converting one or more of the plurality of manifests into a situation image comprising a sub-graph of a situation, wherein the situation image is a scenario pertaining to an interaction between the user and the bot or the another user based on a predicted probability provided by one or more machine learning (ML) models.

2. The computer-implemented method of claim 1, further comprising:

preprocessing the accessed conversation to correct spelling and grammatical errors in the accessed textual conversation, redact sensitive data in the accessed conversation, and remove redundant texts in the accessed textual conversation.

3. The computer-implemented method of claim 1, wherein the pruning of the abstract knowledge graph comprises removing one or more tags from the abstract knowledge graph.

4. The computer-implemented method of claim 3, wherein the pruning of the abstract knowledge graph comprises evaluating one or more remaining tags against a confidence of the one or more machine learning (ML) models, wherein the confidence is the predicted probability computed by the one or more ML models; and discarding ambiguous tags.

5. The computer-implemented method of claim 4, wherein the pruning of the abstract knowledge graph comprises discarding one or more redundant tags and one or more repeated sentence level tags.

6. The computer-implemented method of claim 5, wherein the pruning of the abstract knowledge graph comprises retrieving, based on data enrichment, the one or more attributes associated with one or more entities, and discarding one or more tags associated with the one or more retrieved attributes from the knowledge graph.

7. The computer-implemented method of claim 6, wherein the pruning of the abstract knowledge graph comprises extracting events information from events analysis module;

validating the extracted events information against one or more event chains;

discarding one or more event tags for events where temporal information is unavailable;

discarding one or more sentence tokens when the one or more sentence tokens lack a predetermined number of one or more of tags and links; and storing the pruned abstract knowledge graph for further segmentation for obtaining one or more manifest images.

8. The method of claim 1, further comprising:

segmenting a pruned knowledge graph into one or more of the plurality of manifests, wherein the segmenting comprises the segmenting of the pruned knowledge graph at a sentence token level.

9. The method of claim 8, wherein the segmenting of the pruned knowledge graph comprises initializing one of the manifests with an initial sentence; and evaluating another sentence based on links the other sentence has with the initialized manifest to determine if a new manifest is to be created or the other sentence is to be added to the initialized manifest or another one or more of the plurality of manifests.

10. The method of claim 9, further comprising performing one of:

adding the other sentence to the initial manifest or the other one or more manifests when an association exists between the other sentence and the initial manifest or the other one or more of the plurality of manifests and adding the other sentence to a newly created manifest when an association fails to exist between the other sentence and the initial manifest and between the other sentence and the other one or more of the plurality of manifests.

11. The method of claim 1, further comprising:

summarizing a situation based text upon pruning of the knowledge graph and segmenting of one or more of the plurality of manifests, wherein the summarizing of the situation based text comprises identifying a predicate connected to one or more sentences belonging to a corresponding one of the one or more manifests, and summarizing the situation based text after segmenting the one or more manifests from the pruned knowledge graph, wherein the situation based text is a summarization of a scenario of the one or more sentences.

12. The method of claim 1, further comprising:

detecting whether an entity is animate or inanimate, wherein the detecting of the entity comprises using a data enrichment model, a name entity recognition model, and a syntactic information to identify the animate entity or inanimate entity, wherein the data enrichment model identifying hypernyms to trace a root of the entity, the root identifying the animate entity or the inanimate entity, the named entity recognition model identifying a person tag, the person tag being assigned to the animate entity, the syntactic information comprises of pronouns and one or more proper nouns, the pronouns and one or more nouns are linked through coreference links, and using the syntactic information and the coreference links, the entity is assigned as the animate entity and the inanimate entity.

13. A computer program embodied on a non-transitory computer readable medium, the computer program when executed by one or more processors is configured to execute:

accessing a textual conversation associated with a document stored in memory between a user and at least one of a bot and another user;

generating an abstract knowledge graph, wherein the abstract knowledge graph is a graphical representation of a plurality of entities and links to one or more attributes defining the entities, which are extracted from a natural language text associated with the textual conversation, and wherein the abstract knowledge graph comprises multiple entities representing a plurality of identified situations associated with one or more identified intentions;

generating one or more manifests by pruning the abstract knowledge graph to remove redundant information;

segmenting the pruned abstract knowledge graph into a plurality of manifests each sharing a common entity among the plurality of entities; and converting one or more of the plurality of manifests into a situation image comprising a sub-graph of a situation, wherein the situation image is a scenario pertaining to an interaction between the user and the bot or the another user based on a predicted probability provided by one or more machine learning (ML) models.

14. The computer program of claim 13, wherein the computer program when executed by one or more processors is further configured to execute:
  removing one or more tags from the abstract knowledge graph;
  evaluating one or more remaining tags against a confidence of the one or more machine learning (ML) models, wherein the confidence is the predicted probability computed by the one or more ML models;
  discarding ambiguous tags, wherein discarding of the ambiguous tags comprises
    discarding one or more redundant tags and one or more repeated sentence level tags,
    retrieving, based on data enrichment, the one or more attributes associated with the one or more entities, and
    discarding one or more tags associated with the one or more retrieved attributes from the abstract knowledge graph;
  extracting events information from an events analysis module;
  validating the extracted events information against one or more event chains;
  discarding one or more event tags for events where temporal information is unavailable;
  discarding one or more sentence tokens when the one or more sentence tokens lack a predetermined number of one or more of tags and links; and
  storing the pruned abstract knowledge graph for further segmentation for obtaining one or more manifest images.

15. The computer program of claim 13, wherein the computer program when executed by one or more processors is further configured to execute:
  initializing one of the plurality of manifests with an initial sentence;
  evaluating another sentence based on links the other sentence has with the initialized manifest to determine if a new manifest is to be created or the other sentence is to be added to the initialized manifest or another one or more of the plurality of manifests; and
  performing one of
    adding the other sentence to the initial manifest or the other one or more manifests when an association exists between the other sentence and the initial manifest or the other one or more manifests; and
    adding the other sentence to a newly created manifest when an association fails to exist between the other sentence and the initial manifest and between the other sentence and the other one or more of the plurality of manifests.

16. The computer program of claim 13, wherein the computer program when executed by one or more processors is further configured to execute:
  summarizing a situation based text upon pruning of the knowledge graph and segmenting one or more of the plurality of manifests, wherein the summarizing of the situation based text comprises
    identifying a predicate connected to one or more sentences belonging to a corresponding one of the one or more manifests, and
    summarizing the situation based text after segmenting the one or more manifests from the pruned knowledge graph, wherein the situation based text is a summarization of a scenario of the one or more sentences.

17. The computer program of claim 13, wherein the computer program when executed by one or more processors is further configured to execute:
  detecting whether an entity is animate or inanimate, wherein the detecting of the entity comprises using a data enrichment model, a name entity recognition model, and a syntactic information to identify the animate entity or inanimate entity, wherein the data enrichment model identifying hypernyms to trace a root of the entity, the root identifying the animate entity or the inanimate entity, the named entity recognition model identifying a person tag, the person tag being assigned to the animate entity, the syntactic information comprises of pronouns and one or more proper nouns, the pronouns and one or more nouns are linked through coreference links, and using the syntactic information and the coreference links, the entity is assigned as the animate entity and the inanimate entity.

18. A system, comprising:
  at least one processor; and
  memory comprising a set of instructions, wherein the set of instructions, with the at least one processor, are configured to execute:
  accessing a textual conversation associated with a document stored in memory between a user and at least one of a bot and another user;
  generating an abstract knowledge graph, wherein the abstract knowledge graph is a graphical representation of a plurality of entities and links to one or more attributes defining the entities, which are extracted from a natural language text associated with the textual conversation, and wherein the abstract knowledge graph comprises multiple entities representing a plurality of identifier situations associated with a plurality of corresponding identified intentions;
  generating one or more manifests by pruning the abstract knowledge graph to remove redundance information;
  segmenting the pruned abstract knowledge graph into a plurality of manifests each sharing a common entity among the plurality of entities; and
  converting one or more of the plurality of manifests into a situation image comprising a sub-graph of a situation, wherein the situation image is a scenario pertaining to an interaction between the user and the bot or the another user based on a predicted probability provided by one or more machine learning (ML) models.

19. The system of claim 18, wherein the set of instructions, with the at least one processor, are further configured to execute:
  initializing one of the plurality of manifests with an initial sentence;
  evaluating another sentence based on links the other sentence has with the initialized manifest to determine if a new manifest is to be created or the other sentence is to be added to the initialized manifest or another one or more of the plurality of manifests; and
  performing one of:
    adding the other sentence to the initial manifest or the other one or more of the plurality of manifests when an association exists between the other sentence and the initial manifest or the other one or more manifests; and
    adding the other sentence to a newly created manifest when an association fails to exist between the other sentence and the initial manifest and between the other sentence and the other one or more of the plurality of manifests.

20. The system of claim 18, wherein the set of instructions, with the at least one processor, are further configured to execute:
  detecting whether an entity is animate or inanimate, wherein the detecting of the entity comprises using a data enrichment model, a name entity recognition model, and a syntactic information to identify the animate entity or inanimate entity, wherein the data enrichment model identifying hypernyms to trace a root of the entity, the root identifying the animate entity or the inanimate entity, the named entity recognition model identifying a person tag, the person tag being assigned to the animate entity, the syntactic information comprises pronouns and one or more proper nouns, the pronouns and the one or more nouns are linked through coreference links, and using the syntactic information and the coreference links, the entity is assigned as the animate entity and the inanimate entity.

* * * * *